3,542,689
SPUN POLYMER FILAMENT OPTICALLY
BRIGHTENED WITH 7 - v - TRIAZOLYL-
COUMARIN COMPOUNDS
Rudolf Kirchmayr, Binningen, Hansjörg Heller, Riehen, and Jean Rody, Basel, Switzerland, assignors to Geigy Chemical Corporation, Ardsley, N.Y., a corporation of New York
No Drawing. Filed Feb. 12, 1968, Ser. No. 704,589
Claims priority, application Switzerland, Feb. 16, 1967, 2,319/67
Int. Cl. C09k 1/00; C07d 55/02, 55/04
U.S. Cl. 252—301.2                                      5 Claims

ABSTRACT OF THE DISCLOSURE

A process for the production of optically brightened filaments of spinnable synthetic organic polymers, wherein certain 7-v-triazolyl-coumarin optical brighteners are added to the spinning melt of such polymer and filaments are spun from the brightener-containing melt.

The present invention concerns the use of coumarins which are substituted in the 3-position and contain a v-triazolyl-(2) radical in the 7-position for the optical brightening of polymer melts for spinning, as well as industrial product, the material brightened therewith.

3-phenyl coumarins substituted by a 4,5-areno-v-triazolyl-(2) radical in the 7-position have already been suggested as optical brighteners for organic material. However, these optical brighteners emit a fluorescence having an undesirable greenish tinge or their self-colour is too strongly yellow so that in higher dosages the brightened organic material is given a greenish appearance which greatly diminishes their visual whiteness. In addition, these products have relatively poor fastness to light on polyamide and polyester fibers which are so important in the textile industry and, on longer exposure, the material optically brightened therewith becomes clearly more yellow in colour.

Also 3-phenyl coumarins containing a 4,5-areno-v-triazolyl-(2) group in the p-position of the 3-phenyl radical have been suggested as optical brighteners for textiles. These products, however, have only a weak and greenish fluorescence. They are unsuitable to attain a brilliant optical brightening effect and, therefore, have not become of industrial importance up to the present. The equally known 3-phenyl coumarins containing a v-triazolyl-(1) group in the 7-position also produce insufficient white effects.

It has now been found that the class of v-triazolyl coumarins of Formula I surprisingly embraces more valuable substances which can be used as optical brighteners for polymer melts for spinning

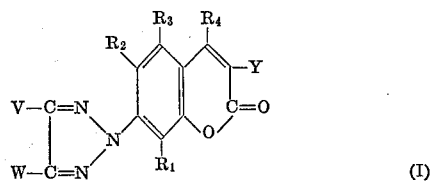

(I)

In this formula:

V and W independently of each other represent an alkyl group or a phenyl or phenylalkyl group either unsubstituted or substituted by non-reactive, non-chromogenic substituents, and Y represents a phenyl group either unsubstituted or substituted by non-reactive, non-chromogenic substituents, and $R_1$ and $R_4$ independently of each other represent hydrogen or a low alkyl group, and $R_2$ and $R_3$ independently of each other represent hydrogen, a low alkyl or alkoxy group.

By non-reactive substituents here and in the following are meant radicals which do not enter into chemical reactions with the substrate to be brightened.

These compounds have little self-colour, i.e., slight absorption of light in the visible part of the spectrum and in daylight have an intensive blue-violet to violet fluorescence. They have considerably better fastness to light than comparable compounds of the prior art. These advantageous properties, combined with a good tolerance in various organic substrates make the new compounds valuable optical brighteners for polymer melts for spinning and fibers and threads made therefrom.

The substituents $R_1$ and $R_4$ are preferably hydrogen, the substituents $R_2$ and $R_3$ in Formula I in preferred optical brighteners, represent hydrogen, methyl or methoxy.

The phenyl group Y, like V and W when representing phenyl or phenylalkyl, can contain, for example, the following non-reactive, non-chromogenic substituents: alkyl groups such as methyl, ethyl, propyl, isopropyl, n-butyl groups; halogens such as fluorine, particularly however chlorine, or also bromine; alkoxy groups such as methoxy, ethoxy, propoxy, butoxy groups; alkylene or alkylene ether groups bound at positions adjacent to the benzene ring such as tetramethylene or methylenedioxy groups; sulphamide groups and sulphamide groups substituted at the nitrogen atom, e.g., optionally substituted N-alkyl-sulphamoyl and N,N-dialkyl-sulphamoyl groups such as N-methyl-, N-ethyl-, N-butyl-, N-hydroxyethyl-, N-methoxyethyl-, N-ethoxyethyl-, N-dimethylaminoethyl-, N-dimethylaminopropyl-, N-diethylaminoethyl-sulphamoyl groups and N-dimethyl- and N-diethyl-sulphamoyl groups and morpholinosulphonyl groups; carboxylic acid amide groups and carboxylic acid amide groups substituted at the nitrogen atom such as carboxylic acid ethylamide, diethylamide, monoethanolamide, carboxylic acid-(3-methoxy-propylamide), carboxylic acid morpholide, carboxylic acid piperidide or carboxylic acid-(3-dimethylamino)-propylamide groups; and substituted alkyl groups.

In particularly preferred compounds, V and W represent low alkyl groups, the benzyl group, unsubstituted phenyl groups or phenyl groups substituted by halogen, alkyl, alkoxy or carboxylic acid amide groups, $R_1$, $R_2$, $R_3$, and $R_4$ represent hydrogen, and Y represents the phenyl group.

Too many electron donors in the phenyl radicals V, W and Y is disadvantageous as such substitution lends an undesirable green tinge to the brightener.

v-Triazoles of Formula I which can be used according to the invention can be produced by different methods; preferably one of the methods A and B described below is followed:

Method A

In this method, an oxime hydrazone of an α-diketone of Formulae IIa and IIb.

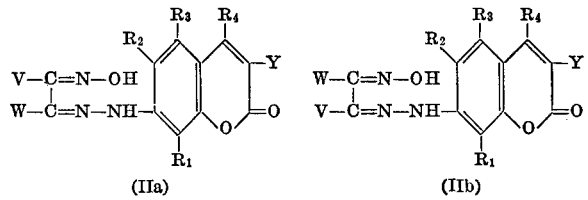

(IIa)                              (IIb)

wherein $R_1$, $R_2$, $R_3$, $R_4$, V, W and Y have the meanings given in Formula I, is condensed with protonic acids or by means of acid anhydrides while splitting off water and closing the ring, optionally with heating, to form compounds of Formula I

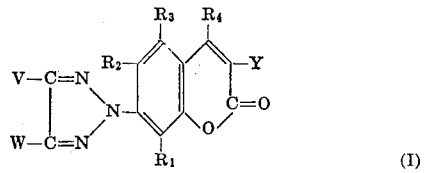
(I)

The condensation can be performed in the presence of organic solvents which are inert under the reaction conditions. As such, high boiling hydrocarbons and halogenated hydrocarbons, e.g., chlorobenzene, dichlorobenzenes, xylenes, can be used; also inert slightly or more strongly basic solvents can be used, e.g., dimethyl formamide, dimethyl acetamide, or pyridine, picolines, quiolines. Cyclisation can be performed by simply allowing the reaction mixture to stand or by heating it, depending on the substituents of the oxime hydrazones. The reaction is performed at temperatures between room temperature and 250° C., preferably at 200° C. Sometimes the presence of basic catalysts such as anhydrous alkali and alkaline earth salts of organic acids, e.g., sodium or potassium acetate, produces favourable results with regard to yields and purity of the end products. The progress of ring closure can be best followed by thin layer chromatography. The occurrence of O-acylated intermediate products when mixed inorganic/organic or pure organic acid anhydrides are used has no great influence on the course of the reaction.

Method B

A second, advantageous process for the production of the coumarin compounds of Formula I consists in oxidising the oxime hydrazones of α-diketones of general Formulae IIa and IIb discussed in Method A to form corresponding triazole oxides of Formulae IIIa and IIIb

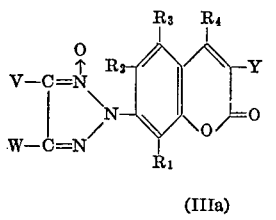 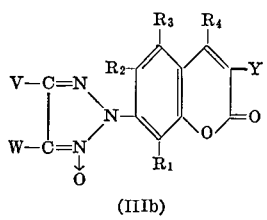

(IIIa)          (IIIb)

and reducing these triazole oxides by known methods to the triazole compound of Formula I. In these formulae too the symbols have the meanings given in Formula I.

The oxidative ring closure can be performed by the action of the most various oxidising agents; it is recommended that cyclisation be performed in solvents which are stable to oxidation. In acid, e.g., acetic acid, solution, bichromate or hydrogen peroxide can be used as oxidising agents; in basic solvents such as pyridine or mixtures of pyridine and water, e.g., potassium ferricyanide or chlorine lye can be used. The generally useful and, therefore, preferred process consists in oxidising with copper-(II) sulphate in pyridine/water. It is not necessary to use stoichiometric amounts of copper because the monovalent copper formed in the reaction can be continuously converted into the divalent state during the reaction by bubbling in air or oxygen.

For the reduction of triazole oxides to triazoles by known methods, advantageously the reduction with base metals and acid is chosen, such as zinc dust in acetic acid or mixtures of acetic acid and water. However, salts of reducing acids of sulphur or phosphorus can also be used for the reduction.

The v-triazoles of Formula I which can be used according to the invention form colourless to yellowish crystalline substances. They lend a pure white appearance in daylight to fibre material produced from polymer melts for spinning into which small amounts thereof have been incorporated by the usual methods before spinning. They are, therefore, valuable optical brighteners. Compared with known, comparable optical brighteners of the coumarin series, they are distinguished by better fasteness to light, a more neutral white effect and, therefore, better colour in artificial light, very good stability to the application temperatures as well as good stability to chemical bleachers such as chlorites, perborates and percarbonates.

They are suitable, therefore, as optical brighteners for substrates of the most various kinds, the preferred group of substrates being determined by the substitution. Thus, v-triazole coumarins of Formula I wherein V is low alkyl, phenyl either unsubstituted or substituted by halogen, alkyl, alkoxy or carboxylic acid amido, and W is phenyl unsubstituted or substituted by halogen, alkyl, alkoxy or carboxylic acid amido, are particularly suitable for the optical brightening of polyester melts for spinning whilst v-triazolyl coumarins wherein V and W are low alkyl are preferred for the optical brightening of polyamide melts for spinning. Particularly suitable substrates are, chiefly, synthetic organic polyplasts, i.e., synthetic materials obtained by polymerisation, e.g., polycondensation or polyaddition such as polyolefins, e.g., polyethylene or polypropylene, also polyvinyl chloride, chiefly however, polyester, particularly polyesters of aromatic polycarboxylic acids with polyvalent alcohols such as polyterephthalic acid glycol ethers and synthetic polyamides such as Nylon 6 and Nylon 66.

The high molecular polymer melts for spinning are optically brightened by incorporating thereinto slight amounts of optical brighteners usable according to the invention, preferably 0.001 to 0.5% calculated on the material to be brightened, optionally together with other substances such as plasticisers, stabilisers or pigments. The brighteners can be incorporated into the polymer melts for spinning, e.g., dissolved in plasticisers such as dioctyl phthalate, or together with stabilisers such as dibutyl tin dilaurate or sodium penta-octyl tripolyphosphate, or together with pigments such as, e.g., titanium dioxide. Depending on the type of material to be brightened, the brightener can also be dissolved in the monomers before polymerisation. The material so pre-treated is then made into the desired final form by known processes such as spinning and drawing.

Further details can be seen from the following examples. The temperatures are given therein in degrees centigrade and the parts are given as parts by weight.

EXAMPLE 1

500 parts of polyamide chips made of ε-caprolactam, 1.5 parts of titanium dioxide (Anatas) and 0.25 part of 2-[3-phenyl-coumarinyl-(7)]-4,5-diphenyl-v-triazole are mixed for 10 hours in a rotary mixer. The mixture is then melted in a stainless steel autoclave at 250–260° while excluding oxygen, extruded under nitrogen pressure from a die and drawn 400%. A brilliant white fibre having good fastness to light is obtained.

EXAMPLE 2

388 g. of benzene-1,4-dicarboxylic acid dimethyl ester, 300 g. of 1,2-ethane diol and 0.4 g. of antimony oxide are placed in a high quality steel autoclave fitted with a stirrer, gas inlet tube, vacuum, sloping condenser, die in the floor which can be closed, a charging valve and a heating jacket. The autoclave is heated to an external temperature of 200° while bubbling through nitrogen and is kept for three hours at this temperature while slowly distilling methanol off. Then, 0.4 g. of 2-[3-phenyl-coumarinyl-(7)]-4,5-diphenyl-v-triazole dissolved in 40 g. of 1,2-ethane diol are carefully added through the charging valve while excluding air and having reduced the temperature to 190°. On completion of the addition, the temperature (external) is raised to 285° within half an hour whereupon 1,2-ethane diol distills off. Vacuum is then put on, the pressure is slowly reduced to 0.2 torr and the condensation is completed for 3 hours under these conditions. Vigorous stirring is performed during these operations. The liquid condensation polymer is then extruded by the die in the floor by nitrogen pressure. Monofilaments can be produced from the polymers so obtained which have a brilliant white appearance.

EXAMPLE 3

1000 parts of terephthalic acid dimethyl ester, 665 parts of ethylene glycol, 0.55 part of manganese acetate, 0.18 part of antimony trioxide and 0.5 part of 2-[3-phenyl-coumarinyl-(7)]-4-methyl - 5 - (4-methylphenyl)-v-triazole are heated together in a stainless steel apparatus fitted with a stirrer and sloping condenser. Methanol begins to split off at a temperature of 160° and in about 2.5 hours no more is split off, the temperature having by this time reached 225°. 5 parts of titanium dioxide and 0.3 part of phosphoric acid are than added to the melt, the pressure in the vessel is reduced to below 1 mm. and the temperature is kept at 290° until the desired degree of polymerisation has been attained. The polymer so obtained is then spun through dies under an excess pressure of inert gas of 2–5 atm. and drawn in the known way. Polyester threads having high grade whiteness are obtained. The brightening agent so incorporated is fast to washing and also has good fastness to light.

A similar effect is obtained if the v-triazole mentioned in this example is replaced by 0.5 part of 2-[3-phenyl-coumarinyl-(7)]-4-methyl-5-phenyl-v-triazole.

EXAMPLE 4

1000 parts of terephthalic acid dimethyl ester, 720 parts of ethylene glycol, 0.2 part of 2-[3-phenyl-coumarinyl-(7)]-4-methyl-5-(4-chlorophenyl)-v-triazole and 4 parts of titanium oxide are heated to a temperature of 155°. 0.3 part of manganese glycol oxide in 3 parts of ethylene glycol are added and the melt is heated until all the methanol has distilled off. On completion of the reaction, the temperature is raised to 225° whereupon the ethylene glycol distills off. 0.4 part of antimony trioxide are then added to the melt and the apparatus is put under vacuum. It is kept for about 1.5 hours at 280–290° under 1 mm. pressure.

On completion of the polymerisation, the melt is extruded through spinning dies in the usual way under inert gas pressure (2–5 excess atmospheres) and the threads obtained are drawn. The polyester threads obtained have high grade whiteness and excellent fastness properties.

A similar but weaker effect is obtained if the v-triazole in the above example is replaced by 0.2 part of 2-[3-phenyl-coumarinyl-(7)] - 4 - methyl - 5 - (3,4 - dichlorophenyl)-v-triazole.

EXAMPLE 5

100 parts of terephthalic acid dimethyl ester, 141 parts of a 70% solution of 1,4-cyclohexane dimethanol (68% transisomeric) in methanol, 0.05 part of 2-[3-phenyl-coumarinyl-(7)]-4-methyl-5-(4-methylphenyl)-v - triazole and an about 20% solution of 0.3 part of magnesium titanium butoxide in n-butanol are heated to 200–210°, while stirring, under an atmosphere of nitrogen. On completion of the alcoholysis, vacuum of below 1 mm. is applied and the temperature is raised to 305°. The desired degree of polymerisation is attained in about 45 minutes and the polymer is then spun through dies under inert gas pressure of 2–5 excess atmospheres in the usual way and drawn. The polyester threads so obtained are distinguished by a brilliant white effect having excellent fastness properties.

A similar effect is obtained if the v-triazole mentioned in this example is replaced by 0.05 part of 2-[3-phenyl-coumarinyl-(7)]-4-methyl-5-phenyl-v-triazole.

EXAMPLE 6

1000 parts of polyester granulate made from polyterephthalic acid glycol ester are intimately mixed with 0.3 part of 2-[3-phenyl-coumarinyl-(7)]-4-methyl-5-phenyl-v-triazole and the mixture is melted at 285° while stirring. Greatly brightened polyester threads are obtained after spinning the melt through the usual dies under a nitrogen pressure of 2–3 excess atmospheres. The white effects obtained have good fastness to washing and light.

A similar effect is obtained if the v-triazole mentioned in this example is replaced by 0.3 part of:

2-[3-phenyl-coumarinyl-(7)]-4-methyl-5-phenyl-v-triazole,
2-[3-phenyl-coumarinyl-(7)]-4-methyl-5-(4-methylpheny)-v-triazole,
2-[3-phenyl-coumarinyl-(7)]-4-methyl-5-(4-chlorophenyl)-v-triazole, or of
2-[3-phenyl-coumarinyl-(7)]-4,5-diphenyl-v-triazole.

EXAMPLE 7

1000 parts of polyester granulate made from polyterephthalic acid ethylene glycol are intimately mixed with 0.2 part of 2-[3-phenyl-coumarinyl-(7)]-4-phenyl-5-(4-chlorophenyl)-v-triazole and then the melt is spun into threads from an extruder through dies in the usual way under nitrogen pressure at a temperature of 260–285°. The polyester threads so obtained have a good degree of whiteness and excellent fastness to light and washing.

A similar effect is obtained if the v-triazole mentioned in this example is replaced by 0.2 part of 2-[3-phenyl-coumarinyl-(7)]-4,5-(4-chlorophenyl - v - triazole or 2-[3-phenyl-coumarinyl-(7)]-4-benzyl-5-phenyl-v-triazole.

EXAMPLE 8

1000 parts of granulate made from polyterephthalic acid-1,4-cyclohexane dimethanol ester are intimately mixed with 0.1 part of 2-[3-phenyl-coumarinyl-(7)]-4-methyl-5-(4-chloro-phenyl)-v-triazole and 0.35 part of titanium dioxide are mixed and then the mixture is melted. After spinning the melt under nitrogen excess pressure through the usual dies, greatly brightened polyester threads are obtained.

A similar effect is obtained if the v-triazole mentioned in this example is replaced by 0.1 part of 2-[3-phenyl-coumarinyl - (7)] - 4 - methyl-5-(3,4-dichlorophenyl)-v-triazole or 2 - [3-phenyl - coumarinyl(7)]-4-methyl-5-phenyl-v-triazole.

Somewhat more green effects are obtained if the v-triazole mentioned in this example is replaced by 0.1 part of 2-[3-phenyl-coumarinyl-(7)]-4-methyl-5-(4-acetaminophenyl)-v-triazole or 2-[3-phenyl-coumarinyl-(7)]-4-methyl-5-(4-methoxy-phenyl)-v-triazole.

EXAMPLE 9

300 parts of hexamethylenediamine adipate are dissolved in 300 parts of 80° hot distilled water. 1.8 parts of sebacic acid, 1.2 parts of titanium dioxide (Anatas) and 0.3 part of 2-[3-phenyl-coumarinyl-(7)]-4-methyl-5-phenyl-v-triazole are added to this solution and the whole is stirred until a homogeneous distribution is attained. The liquid mixture is then put, while excluding oxygen, into an autoclave pre-heated to about 150° and then the temperature is raised within 1 hour to 280°. During this time the pressure in the autoclave is kept below 30 atmospheres by releasing stem. After the maximum temperature of 280–290° has been attained, the pressure is reduced to atmospheric pressure within 10–20 minutes by release of the volatile parts. The mass is then kept at 280° and atomospheric pressure for 4 hours while excluding oxygen. Condensation has proceeded so far after this time that the polycondensate can be spun by nitrogen pressure through a die in the floor of the autoclave. In this way, pure white polyamide threads are obtained.

A similar effect is obtained if the v-triazole mentioned in this example is replaced by 0.3 part of 2-[3-phenyl-coumarinyl-(7)]-4-methyl-5-(4-methylphenyl)-v-triazole.

EXAMPLE 10

400 parts of caprolactam, 40 parts of water, 0.4 part of 2 - [3 - phenyl-coumarinyl-(7)]-4-methyl-5-phenyl-v-triazole and 1.6 parts of titanium dioxide (Anatas) are mixed together and the mixture is heated to about 70° until it becomes liquid. The liquid mixture is placed in a stainless steel autoclave and heated to a temperature of about 250° within 1 hour while excluding oxygen. There is a pressure of 10–15 atmospheres. After this time, the water is distilled off and, to completely remove gas, the polymeric mass is kept for 3 hours without pressure at 250°. The mass attains a viscosity in this way which enables the polymerisate to be extruded by nitrogen pressure through a die on the floor of the pressure vessel in the form of filaments. Monomeric parts are removed from the solidified polyamide by extraction with water. The polyamide filament so obtained is distinguished by very high grade whiteness. The optical brightener is fixed wash fast and the polyamide threads, the appearance of which has been improved, have good fastness to light.

A similar effect is obtained if the v-triazole mentioned in the above example is replaced by 0.4 part of:

2-[3-phenyl-coumarinyl-(7)]-4-methyl-5-(4-methylphenyl)-v-triazole,
2-[3-phenyl-coumarinyl-(7)]-4-benzyl-5-phenyl-v-triazole, or
2-[3-phenyl-coumarinyl-(7)]-4,5-diphenyl-v-triazole.

EXAMPLE 11

1000 parts of granulated Nylon 6 (produced from ε-caprolactam) and 5 parts of finely pulverised 2-[3-phenyl-coumarinyl-(7)]-4-methyl-5-phenyl-v-triazole are mixed for 3 hours in a roller mixer. The granulate is then extruded by means of a screw extruder at a mass temperature of 250° as an endless spiral of 2 mm. diameter and is then granulated. The material so obtained has an improved colour over the starting granulate, i.e., it has a high degree of whiteness. It can be spun in the usual machines into filaments which have brilliant whiteness.

If in the above example, instead of 1000 parts of granulated Nylon 6, the same number of parts of Nylon 66 (produced from hexamethylene adipate) are used and the procedure given in the example is followed, then filaments having brilliant whiteness are also obtained.

EXAMPLE 12

1000 parts of granulated Terylene (produced from polyterephthalic acid ethylene glycol ester) and 1 part of finely pulverised 2-[3-phenyl-coumarinyl-(7)]-4-methyl-5-phenyl-v-triazole are mixed for 3 hours in a roller mixer. The granulate is then extruded by means of a screw extruder at a mass temperature of 250° as endless spiral of 2 mm. diameter and is then granulated. The material so obtained has an improved colour over the starting granulate, i.e., it has a high degree of whiteness. It can be spun in the usual machines into filaments which have brilliant whiteness.

EXAMPLE 13

1000 parts of polyamide produced in the known way from hexamethylene adipate, in the form of chips, 4 parts of titanium dioxide and 1.0 part of 2-[3-phenyl-coumarinyl-(7)]-4,5-dimethyl-v-triazole are well mixed for 12 hours in a roller mixer. The chips are then placed in a drum, the air is replaced by superheated steam and the chips are melted and the melt is stirred for half an hour. The melt is extruded in the known way through dies under a nitrogen pressure of 4–5 excess atmospheres and the filament is drawn and wound onto a bobbin. The polyamide threads formed have a brilliant brightening effect which is stable to thermofixing and has very good fastness to washing and light.

A similar effect is obtained if the v-triazole mentioned in this example is replaced by 1.0 part of 2-[3-phenyl-coumarinyl-(7)]-4-methyl-5-ethyl-v-triazole.

A similar but weaker effect is obtained if the v-triazole mentioned in this example is replaced by 1.0 part of 2-[3-phenyl-coumarinyl-(7)]-4-methyl-5-benzyl-v-triazole.

EXAMPLE 14

1000 parts of polyamide chips produced in the usual way from hexamethylene adipate, 5 parts of titanium dioxide and 0.5 part of 2-[3-phenyl-coumarinyl-(7)]-4-methyl-5-phenyl-v-triazole are mixed in a drum for 10–16 hours. The chips so treated are melted in an apparatus while excluding oxygen and the melt is stirred for a short time. The melt is then spun through dies under a nitrogen pressure of 5 excess atmospheres and the filament is drawn. The polyamide threads so obtained have high grade whiteness. This white effect has good fastness to washing and light and is not adversely affected by thermofixing.

A similar effect is obtained if the v-triazole mentioned in this example is replaced by 0.5 part of 2-[3-phenyl-coumarinyl-(7)]-4,5-diphenyl-v-triazole or by 0.6 part of 2 - [3 - phenyl - coumarinyl - (7)]-4-benzyl-5-phenyl-v-triazole.

EXAMPLE 15

1000 parts of polyamide chips obtained in the known way from ε-caprolactam, 5 parts of titanium dioxide and 0.5 part of 2 - [3 - phenyl-coumarinyl-(7)]-4,5-dimethyl-v-triazole are mixed in a drum for 12–16 hours. The chips so treated are melted in an apparatus while excluding oxygen and the melt is stirred for a short time. The melt is then spun through dies under 3–5 excess atmospheres nitrogen pressure and the filament is drawn. The threads obtained have high grade whiteness. The white effect is very fast to light and washing and is not adversely affected by thermofixation.

A similar effect is obtained if the v-triazole mentioned in this example is replaced by 0.5 part of 2-[3-phenyl-coumarinyl-(7)]-4-methyl-5-ethyl-v-triazole.

EXAMPLE 16

100 parts of polyethylene and 0.5 part of titanium dioxide and 0.05 part of 2-[3-phenyl-coumarinyl-(7)]-4-methyl-5-(4-methylphenyl)-v-triazole are homogenised at 200° in a kneader and the mass is then spun at 280–330° under inert gas pressure of 2–3 excess atmospheres through dies in the known way into threads. The polyethylene threads so obtained have high grade whiteness.

A similar effect is obtained if the v-triazole mentioned in the above example is replaced by 0.05 part of 2-[3-phenyl-coumarinyl - (7)] - 4 - methyl - 5 - ethyl-v-triazole or 2 - [3 - phenyl-coumarinyl-(7)]-4-methyl-5-phenyl-v-triazole.

EXAMPLE 17

100 parts of polypropylene, 0.5 part of titanium dioxide and 0.06 part of 2-[3-phenyl-coumarinyl-(7)]-4-methyl-5-phenyl-v-triazole are homogenised at 200° in a kneader. The mass is then spun at 280–300° under inert gas pressure of 2–3 excess atmospheres through dies in the known way. The polypropylene threads so obtained are distinguished by high grade whiteness.

A similar effect is obtained if the triazole mentioned in the above example is replaced by 0.06 part of 2-[3-phenyl-coumarinyl - (7)] - 4 - methyl - 5 - (4-methylphenyl)-v-triazole or 2-[3-phenyl-coumarinyl - (7)]-4,5-dimethyl-v-triazole.

EXAMPLE 18

If, in Example 12, the 2-[3-phenyl-coumarinyl-(7)]-4-methyl-5-phenyl-v-triazole is replaced by one of the following v-triazoles and the procedure given in Example 12 is followed, then threads having an improved degree of whiteness are also obtained.

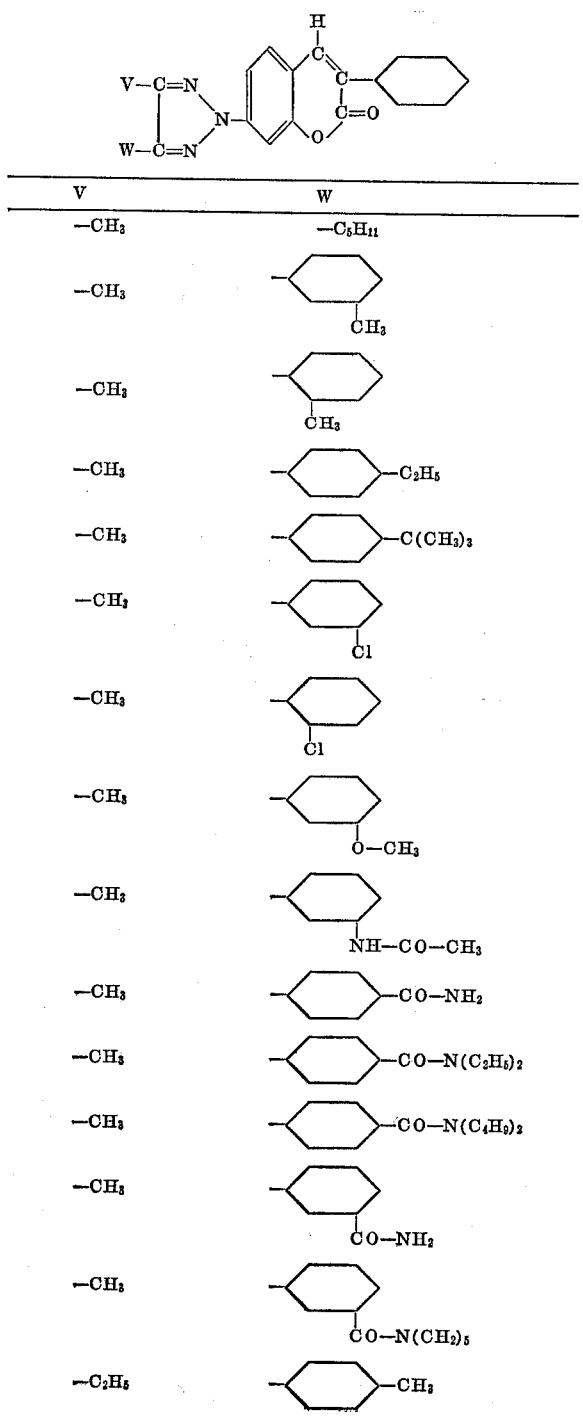

| V | W |
|---|---|
| —CH₃ | —C₅H₁₁ |
| —CH₃ | ⌬-CH₃ (ortho) |
| —CH₃ | ⌬-CH₃ (meta) |
| —CH₃ | ⌬-C₂H₅ |
| —CH₃ | ⌬-C(CH₃)₃ |
| —CH₃ | ⌬-Cl (meta) |
| —CH₃ | ⌬-Cl (para) |
| —CH₃ | ⌬-O-CH₃ |
| —CH₃ | ⌬-NH-CO-CH₃ |
| —CH₃ | ⌬-CO-NH₂ |
| —CH₃ | ⌬-CO-N(C₂H₅)₂ |
| —CH₃ | ⌬-CO-N(C₄H₉)₂ |
| —CH₃ | ⌬-CO-NH₂ |
| —CH₃ | ⌬-CO-N(CH₂)₅ |
| —C₂H₅ | ⌬-CH₃ |

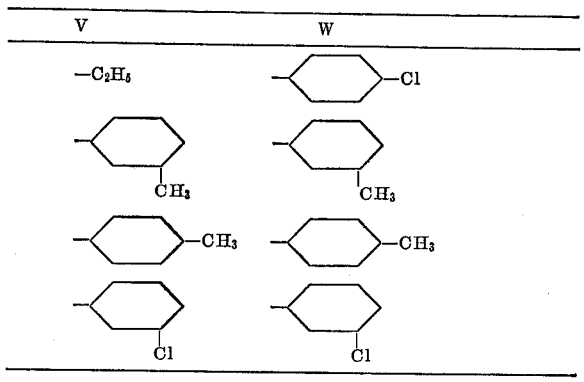

| V | W |
|---|---|
| —C₂H₅ | ⌬-Cl |
| ⌬-CH₃ | ⌬-CH₃ |
| ⌬-CH₃ | ⌬-CH₃ |
| ⌬-Cl | ⌬-Cl |

We claim:
1. A filament spun from a spinnable polyester, polyolefin, or polyamide polymer containing a v-triazolyl-coumarin of the formula:

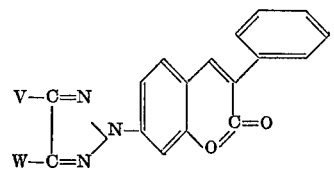

wherein V and W each independently is alkyl of 1 to 5 carbon atoms; benzyl; phenyl; or phenyl mono-substituted by alkyl 1 to 4 carbon atoms, methoxy, chlorine, acetamino, aminocarbonyl, diethylaminocarbonyl, and dibutylaminocarbonyl; or phenyl disubstituted by chlorine; in sufficient amount to be optically brightened thereby.

2. A filament as claimed in claim 1 wherein said polymer is polyamide.
3. A filament as claimed in claim 1 wherein said polymer is a polyester of terephthalic acid and ethylene glycol.
4. A filament as claimed in claim 1 wherein said polymer is polyethylene.
5. A filament as claimed in claim 1 wherein said polymer is polypropylene.

References Cited

UNITED STATES PATENTS 3,251,851  5/1966  Schellhammer et al. __ 260—308
3,288,801  11/1966  Fleck et al. _____ 260—308
3,322,680  5/1967  Hedberg et al. _____ 252—301.2

HELEN M. McCARTHY, Primary Examiner

A. P. DEMERS, Assistant Examiner

U.S. Cl. X.R.

117—33.5; 260—308, 343.2